United States Patent
Robuck et al.

(10) Patent No.: US 11,125,314 B2
(45) Date of Patent: Sep. 21, 2021

(54) DEMISTER FOR A GEARING SYSTEM AND METHOD

(71) Applicant: THE BOEING COMPANY, Chicago, IL (US)

(72) Inventors: Mark Joseph Robuck, Chadds Ford, PA (US); Patrick M. Ridgley, Media, PA (US)

(73) Assignee: THE BOEING COMPANY, Chicago, IL (US)

( * ) Notice: Subject to any disclaimer, the term of this patent is extended or adjusted under 35 U.S.C. 154(b) by 191 days.

(21) Appl. No.: 16/654,300

(22) Filed: Oct. 16, 2019

(65) Prior Publication Data

US 2021/0116013 A1    Apr. 22, 2021

(51) Int. Cl.
| | |
|---|---|
| *F16H 55/17* | (2006.01) |
| *F16H 57/04* | (2010.01) |
| *B01D 45/14* | (2006.01) |
| *F16H 1/02* | (2006.01) |
| *F01M 13/04* | (2006.01) |

(52) U.S. Cl.
CPC ......... *F16H 57/0404* (2013.01); *B01D 45/14* (2013.01); *F01M 13/04* (2013.01); *F16H 1/02* (2013.01)

(58) Field of Classification Search
CPC ... F16H 57/0404; B01D 45/14; F04C 29/026; F01M 2013/0427; F01M 13/04
See application file for complete search history.

(56) References Cited

U.S. PATENT DOCUMENTS

| | | | | |
|---|---|---|---|---|
| 6,033,450 A | * | 3/2000 | Krul ................. | B01D 45/14 55/345 |
| 6,139,595 A | * | 10/2000 | Herman ............. | B01D 45/14 55/312 |
| 6,398,833 B1 | * | 6/2002 | Santerre ............ | B01D 45/12 55/409 |

(Continued)

OTHER PUBLICATIONS

GT2012-68895 Performance Study of an Air-Oil Pump and Separator Solution Johan Steimes, Francois, Gruselle, Patrick Hendrick Proceedings of ASME Turbo Expo 2012, Jun. 11-15, 2012, Copenhagen, Denmark.

(Continued)

*Primary Examiner* — Jake Cook
(74) *Attorney, Agent, or Firm* — The Small Patent Law Group LLC; Joseph M. Butscher

(57) ABSTRACT

A demister for a gearing system includes a main body shaped as a disk having an inner annular rim coupled to an outer annular rim through a first wall and a second wall opposite from the first wall. A central opening is defined by the inner annular rim and extends between and through the first wall and the second wall. The main body is configured to be rotated about a central longitudinal axis to create centrifugal forces that separate oil mist particles from air. At least one fluid passage extends radially between and through the inner annular rim and the outer annular rim. The fluid passage(s) includes a fluid inlet opening in the outer annular rim and a fluid outlet opening in the inner annular rim. The fluid inlet opening is configured to accept incoming air. The fluid outlet opening is configured to discharge filtered air.

20 Claims, 6 Drawing Sheets

(56) References Cited

U.S. PATENT DOCUMENTS

| | | | | |
|---|---|---|---|---|
| 8,337,581 B2* | 12/2012 | Dejaune | ................ | B01D 45/14 |
| | | | | 55/406 |
| 2015/0176447 A1* | 6/2015 | Beier | ....................... | F02C 7/06 |
| | | | | 415/110 |

OTHER PUBLICATIONS

GT2017-64327 The Improvement of Air/Oil Separator Performance in the Aero-Engine Lubrication System Lyu Yaguo, Shen Jieyang, Liu Zhenxia, Hu Jianping Proceedings of ASME Turbo Expo 2017: Turbomachinery Technical Conference and Exposition.
Ronald D. Belden & William J. Reddy (1994) Lubrication Oil Reservoir Mist Elimination, Air & Waste, 44:4, 441-451, DOI: 10.1080/1073161X.1994.10467266.

* cited by examiner

- 400: Rotating a main body of a demister to create centrifugal forces that separate oil mist particles from air
- 402: Accepting incoming air at a fluid inlet opening in an outer annular rim of a fluid passage
- 404: Discharging filtered air from a fluid outlet opening in an inner annular rim

DEMISTER FOR A GEARING SYSTEM AND METHOD

FIELD OF EMBODIMENTS OF THE DISCLOSURE

Embodiments of the present disclosure generally relate to oil-separating devices for gearing systems and methods, such as may be used with auxiliary power units.

BACKGROUND OF THE DISCLOSURE

Various vehicles, such as commercial aircraft, include one or more auxiliary power units (APUs). An APU generally provides energy for functions other than propulsion. A typical APU includes a gearbox that transfers power from a main shaft of an engine to a generator for electrical power. Within the gearbox, power may also be transferred to engine accessories, such as a fuel control unit, a lubrication module, and a cooling fan.

During operation, a stream of air from an engine secondary air system (for example, cooling and seal air) passes through the gearbox as the air is routed to an exhaust. The air typically carries oil mist particles from the gearbox. As such, an air-oil separating device is used to separate the oil mist particles from the air. However, there is typically a portion of remaining oil that is transported out of the gearbox, which leads to a steady rate of oil consumption from a lubricating system.

Some systems include oil separating devices such as wire mesh or sintered barrier filter media to entrain the oil mist and return it to the gearbox. However, such systems may generate increased backpressure.

SUMMARY OF THE DISCLOSURE

A need exists for an air-oil separating device that effectively and efficiently removes oil from air. Further, a need exists for an air-oil separating device that reduces backpressure and oil consumption rate.

With those needs in mind, certain embodiments of the present disclosure provide a demister for a gearing system. The demister includes a main body shaped as a disk having an inner annular rim coupled to an outer annular rim through a first wall and a second wall opposite from the first wall. A central opening is defined by the inner annular rim and extends between and through the first wall and the second wall. The main body is configured to be rotated about a central longitudinal axis to create centrifugal forces that separate oil mist particles from air. At least one fluid passage extends radially between and through the inner annular rim and the outer annular rim. The fluid passage(s) includes a fluid inlet opening in the outer annular rim and a fluid outlet opening in the inner annular rim. The fluid inlet opening is configured to accept incoming air. The fluid outlet opening is configured to discharge filtered air.

In at least one embodiment, a fluid entrance channel is in fluid communication with the fluid inlet opening in the outer annular rim. The fluid entrance channel extends along a portion of a circumference of the outer annular rim. In at least one embodiment, the fluid entrance channel includes a proximal end fluidly coupled to the fluid inlet opening and a distal end distally away from a union of the fluid inlet opening and the proximal end. A first depth of the fluid entrance channel at the distal end may be less than a second depth of the fluid entrance channel at the proximal end. In at least one embodiment, the fluid entrance channel is offset from a central axis of the fluid passage(s).

In at least one embodiment, the fluid passage(s) is angled with respect to a radial line extending from the central longitudinal axis. The fluid passage(s) may be angled toward or away from a direction of rotation. For example, the fluid inlet opening may be canted radially forward or rearward with respect to a direction of rotation from the fluid outlet opening.

Certain embodiments of the present disclosure provide a gearing system including a first gear having a central shaft defining a central channel, a second gear, and a demister coupled to the first gear and the second gear, as described herein. The gearing system may also include a mesh insert disposed within the central channel. The gearing system may also include a stationary shroud positioned around at least a portion of the demister.

Certain embodiments of the present disclosure provide a gearing method for separating oil mist particles from air, such as through centrifugal force. The gearing method includes rotating a main body shaped as a disk having an inner annular rim coupled to an outer annular rim through a first wall and a second wall opposite from the first wall about a central longitudinal axis. Said rotating creates centrifugal forces that separate the oil mist particles from the air. The gearing method also includes accepting incoming air at a fluid inlet opening in an outer annular rim of at least one fluid passage that extends radially between and through the inner annular rim and the outer annular rim and discharging filtered air having a reduced amount of the oil mist particles from a fluid outlet opening in the inner annular rim.

BRIEF DESCRIPTION OF THE DRAWINGS

FIG. 8 illustrates an axial cross-sectional view of the gearing system, according to an embodiment of the present disclosure.

FIG. 9 illustrates a flow chart of a gearing method that is configured to separate oil mist particles from air, according to an embodiment of the present disclosure.

DETAILED DESCRIPTION OF THE DISCLOSURE

Figure 1:
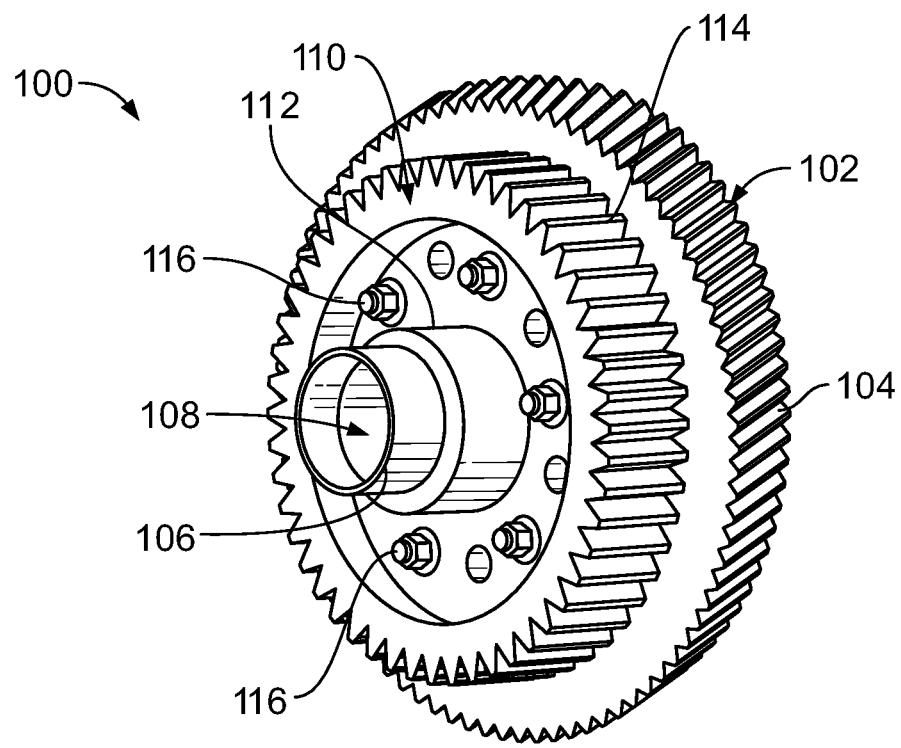
FIG. 1 illustrates a perspective front view of a gearing system, according to an embodiment of the present disclosure.

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps.

Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a demister (for example, a device for separating air from oil) for gearing systems and methods. In at least one embodiment, the demister includes a disk-shaped body having radial fluid passages. The demister acts as an air-oil separator through centrifugal effects produced by high speed rotation. The fluid passages are fluidly coupled to fluid entrance channels, such as formed within an outer annular wall, which create a swirling motion as an air-oil mixture flows into the radial passages.

The demister provides an air-oil separator that uses a rotational or centrifugal force field to separate denser oil mist particles from air that is discharged from a gearbox ventilation line. In at least one embodiment, the fluid passages are angled such as to be biased toward or away from a direction of rotation. In addition, the demister imparts an additional spin to air entering the radial holes for increased oil-separating effectiveness. The spin is produced by machining the fluid entrance channel at the edge of the radial hole. The fluid entrance channel causes the fluid mixture (of air and oil mist particles) to swirl into the radial hole as it travels through the device and is exhausted. The swirling motion causes additional centrifugal force that accelerates the oil particles to the walls of the radial hole, where the oil particles adhere and coalesce with other oil particles, thereby increasing oil separation. In at least one embodiment, the device does not use barrier filters which may otherwise cause higher pressure drops and potential contamination.

Certain embodiments of the present disclosure provide a demister including a disk-shaped plate having a central opening and configured to be rotated about a central axis to create centrifugal forces. The centrifugal forces are configured to separate oil mist particles from incoming air to create filtered exhaust air and leave separated oil mist particles behind. The disk-shaped plate includes a plurality of radial passages with openings at the outer and inner edges of the plate. The radial passages are configured to accept the incoming air at the outer edge and emit filtered exhaust air from the inner edge. In at least one embodiment, the plurality of radial passages are angled. For example, the plurality of radial passages are angled toward a direction of rotation. In at least one embodiment, the angle of the radial passages is selected to produce variation in a desired pressure ratio between the outer and inner edges of the plate. In at least one embodiment, the demister includes a plurality of entrance channels along the outer edge of the disk-shaped plate. Each of the entrance channels leads to an edge of a respective radial passage. The entrance channels are aligned to produce additional centrifugal forces.

Certain embodiments of the present disclosure provide a method including rotating a disk-shaped plate about a central axis to create centrifugal forces. The plate has a central opening and includes a plurality of radial passages with openings at the outer and inner edges of the plate. The method also includes bringing incoming air into contact with the outer edge of the disk-shaped plate. The incoming air includes oil mist particles. The method also includes separating the oil mist particles from the incoming air to create filtered exhaust air by using the centrifugal forces and the radial passage openings located at the outer edge, and emitting the filtered exhaust air from the radial passage openings located at the inner edge. The method may also include using a plurality of entrance channels along the outer edge of the disk-shaped plate to cause increased rotational velocity in the incoming air and improve the effectiveness of said separating.

FIG. 1 illustrates a perspective front view of a gearing system 100, according to an embodiment of the present disclosure. The gearing system 100 includes a first gear 102 having a geared circumferential edge 104 and a central shaft 106 defining a central channel 108. A second gear 110 is mounted to the first gear 102. The second gear 110 has a central opening 112 into which the central shaft 106 of the first gear 102 is positioned. The second gear 110 also includes a geared circumferential edge 114 and is secured to the first gear through a plurality of fasteners 116, such as bolts and nuts.

Figure 2:
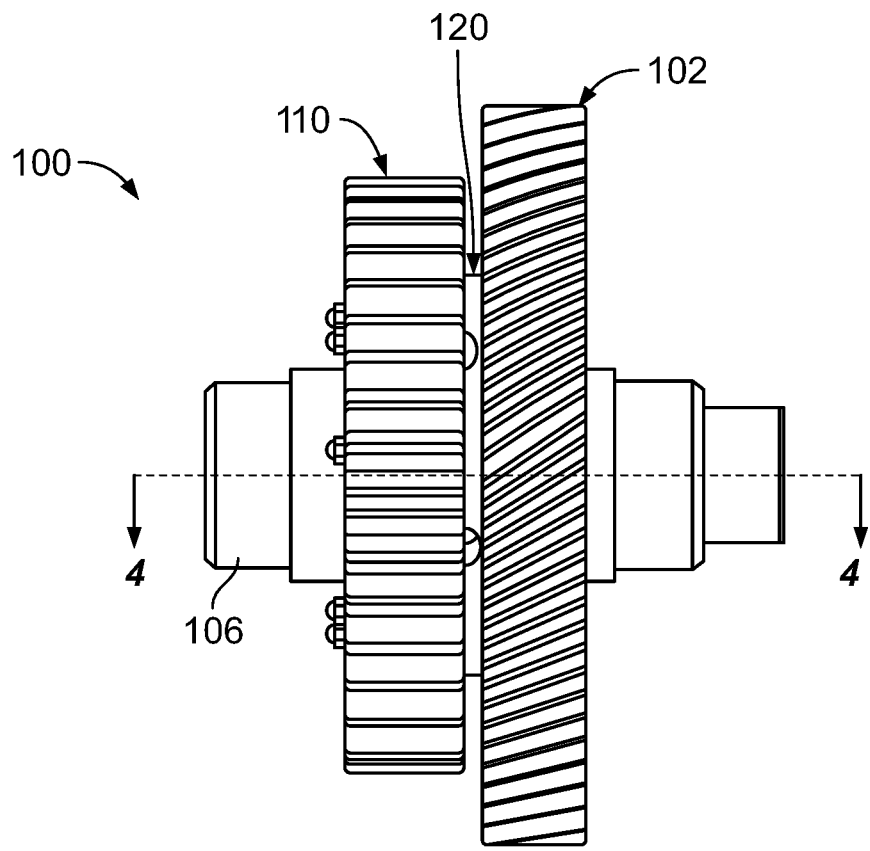
FIG. 2 illustrates a top view of the gearing system.
Figure 3:
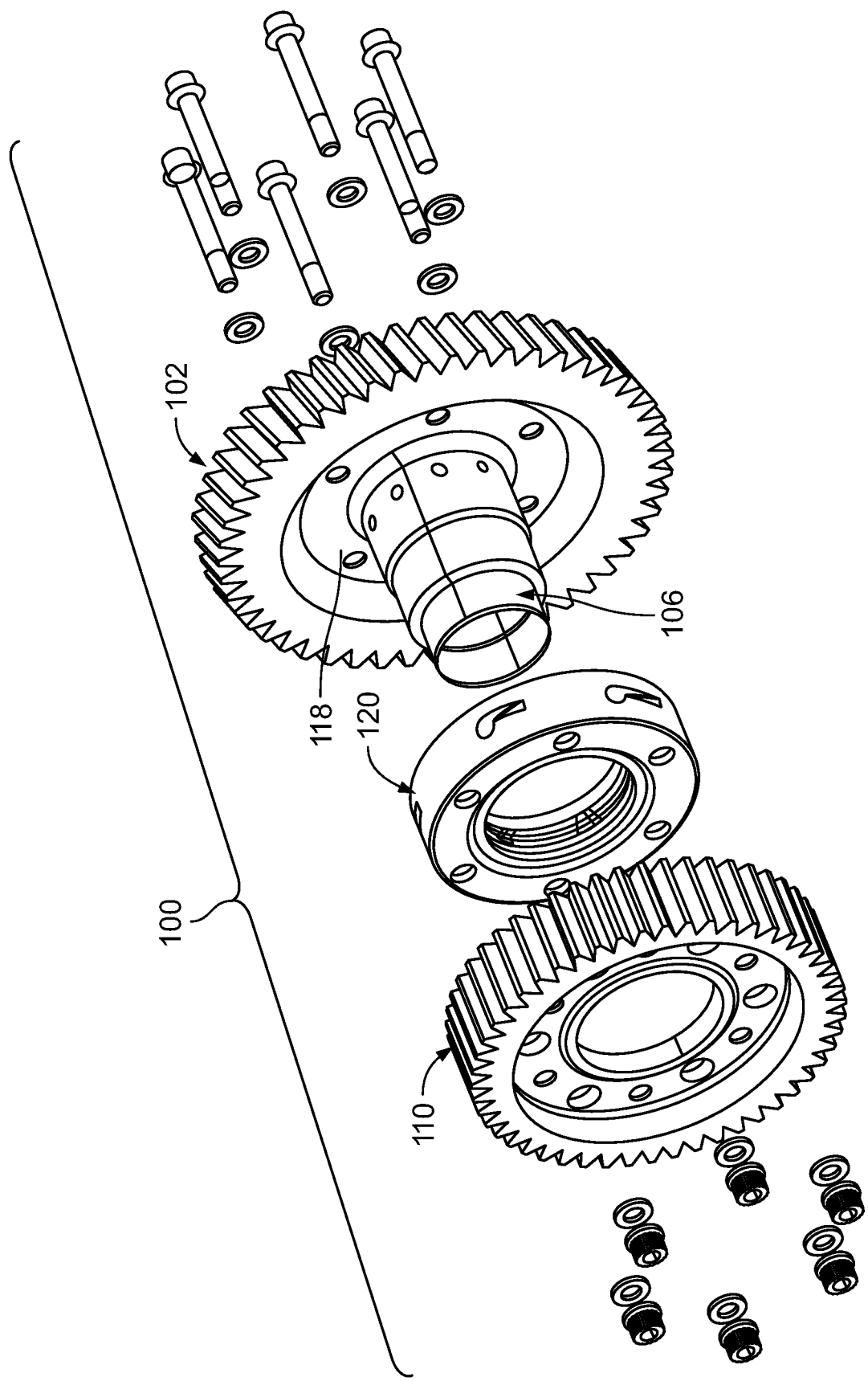
FIG. 3 illustrates a perspective exploded front view of the gearing system.
Figure 4:
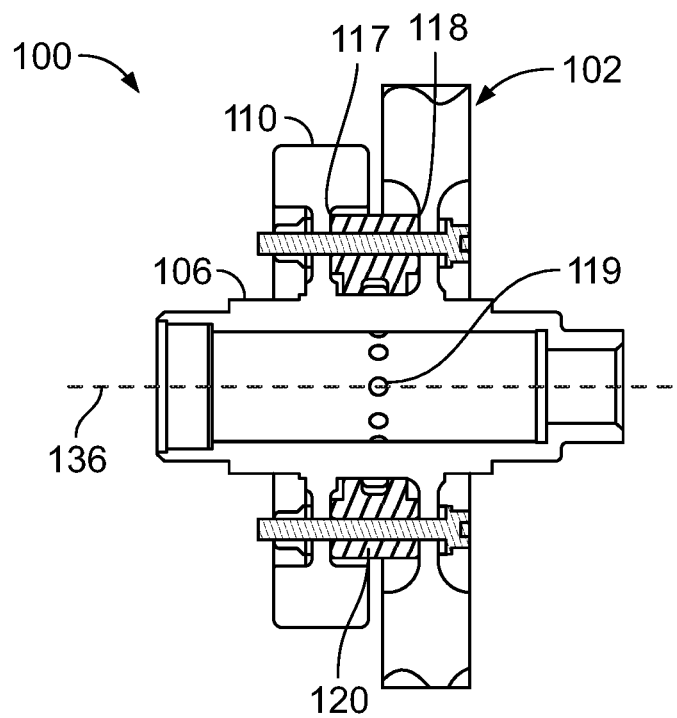
FIG. 4 illustrates an axial cross-sectional view of the gearing system through line 4-4 of FIG. 2.

FIG. 2 illustrates a top view of the gearing system 100. FIG. 3 illustrates a perspective exploded front view of the gearing system 100. FIG. 4 illustrates an axial cross-sectional view of the gearing system 100 through line 4-4 of FIG. 2. Referring to FIGS. 2-4, the gearing system 100 also includes a demister 120 that fits around a portion of the central shaft 106 of the first gear 102 and is sandwiched between a rear face 117 of the second gear 110 and a front face 118 of the first gear 102.

Figure 5:
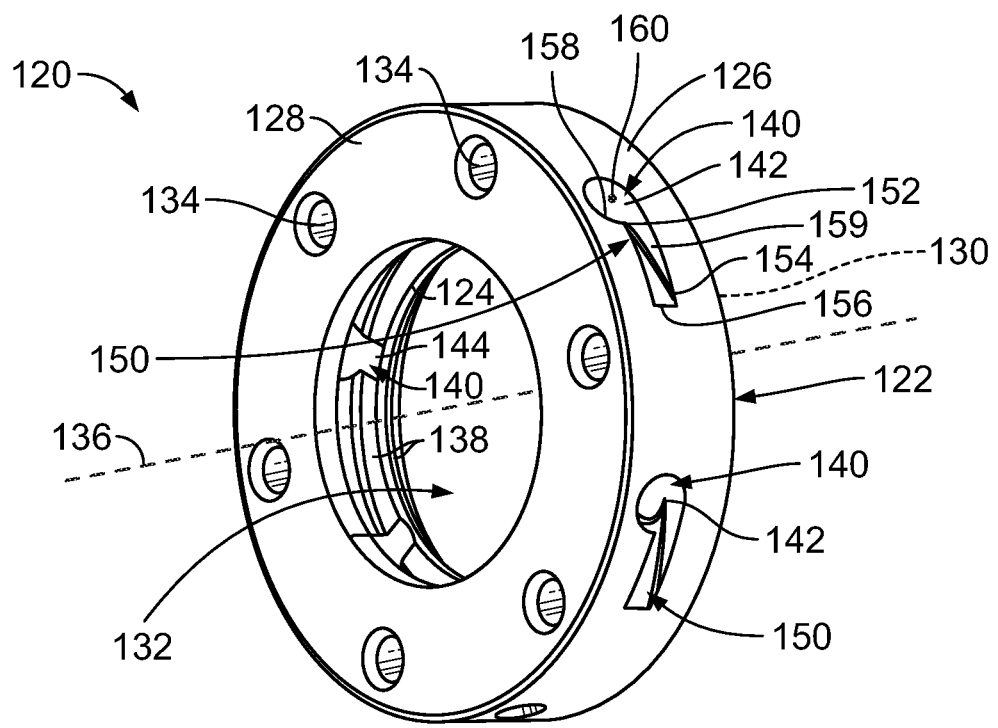
FIG. 5 illustrates a perspective front view of a demister, according to an embodiment of the present disclosure.

FIG. 5 illustrates a perspective front view of the demister 120, according to an embodiment of the present disclosure. The demister 120 may be integrally formed as a single piece of metal, such as steel, for example.

The demister 120 includes a main body 122, which may be formed as a disk-shaped plate. The main body 122 includes an inner annular rim 124 coupled to an outer annular rim 126 through a first or front wall 128 and a second or rear wall 130 that is opposite from the front wall 128. A central opening 132 is defined by the inner annular rim 124 and extends between and through the front wall 128 and the rear wall 130. Referring to FIGS. 1-5, the central shaft 106 of the first gear 102 extends through the central opening 132, such that the inner annular rim 124 fits around outer portions of the central shaft 106.

A plurality of fastener through-holes 134 extend through the main body 122 between and through the front wall 128 and the rear wall 130. The fastener through-holes 134 are generally parallel to a central longitudinal axis 136 and are configured to receive portions of the fasteners 116, so as to securely fasten the demister 120 to the first gear 102 and the second gear 110. The fastener through-holes 134 may be regularly-spaced around the main body 122. The demister 120 may include more or less fastener through-holes 134 than shown.

A fluid channel 138 is formed into the inner annular rim 124 and may extend around a circumference of the inner annular rim 124. The fluid channel 138 extends into the inner annular rim 124 but does not extend entirely through the main body 122 to the outer annular rim 126.

A plurality of fluid passages 140 extend radially between and through the inner annular rim 124 the outer annular rim 126. Each fluid passage 140 includes a fluid inlet opening 142 in the outer annular rim 126 and a fluid outlet opening 144 (which is in fluid communication with the fluid inlet opening 142) formed in the inner annular rim 124. The fluid outlet openings 144 may fluidly couple to the fluid channel 138. In at least one embodiment, a diameter of at least one fluid passage 140 may be ¼". Optionally, the diameter of the fluid passages 140 may be greater or less than ¼".

The fluid inlet openings 142 are configured to accept incoming air, which may include oil mist particles. The fluid outlet openings 144 are configured to discharge filtered air that is devoid of oil mist particles, or otherwise includes a reduced amount of oil mist particles as compared to the incoming air. As described herein, the centrifugal forces exerted into the incoming air due to the rotation of the demister 120 causes the oil mist particles to separate from the air, thereby allowing the filtered air to pass out of the fluid outlet openings 144.

The demister 120 also includes a fluid entrance channel 150 in fluid communication with at least one fluid inlet opening 142 formed in the outer annular rim 126. For example, each fluid passage 140 may be in fluid communication with a fluid entrance channel 150 formed into the outer annular rim 126. The fluid entrance channels 150 do not extend to the inner annular rim 124.

Each fluid entrance channel 150 extends along a portion of a circumference of outer annular rim 126. That is, each fluid entrance channel 150 is circumferentially formed into the outer annular rim 126. Each fluid entrance channel 150 includes a proximal end 152 that fluidly couples to a fluid inlet opening 142 and a distal end 154 that is distally away from a union of the fluid inlet opening 142 and the proximal end 152.

A first depth 156 of the fluid entrance channel 150 at the distal end 154 is less than a second depth 158 of the fluid entrance channel 150 at the proximal end 152. The first depth 156 may be the shallowest portion (that is, a shortest depth into the outer annular rim 126) of the fluid entrance channel 150, and the second depth 158 may be the deepest portion (that is, a longest depth into the outer annular rim 126) of the fluid entrance channel 150. In at least one embodiment, the depth of the fluid entrance channel increases at a constant rate from the distal end 154 to the proximal end 152. In at least one embodiment, the fluid entrance channel 150 is a radial segment having a central axis 159 that is offset from a central axis 160 of the fluid passage 140 to which the fluid entrance channel 150 connects. For example, the central axis 159 of the fluid entrance channel 150 is not coplanar with the central axis 160 of the fluid passage 140. Optionally, the fluid entrance channel 150 may not be offset from the central axis 160. As one example, a fluid entrance channel 150 may be formed by placing an end mill (such as a ⅛" end mill) onto a fluid inlet opening 142 and forming the second depth 158 between 0.10" and 0.50" and tangentially forming the remainder of the fluid entrance channel 150 to the distal end 154. Alternatively, the demister 120 may not include the fluid entrance channels 150.

Figure 6A:
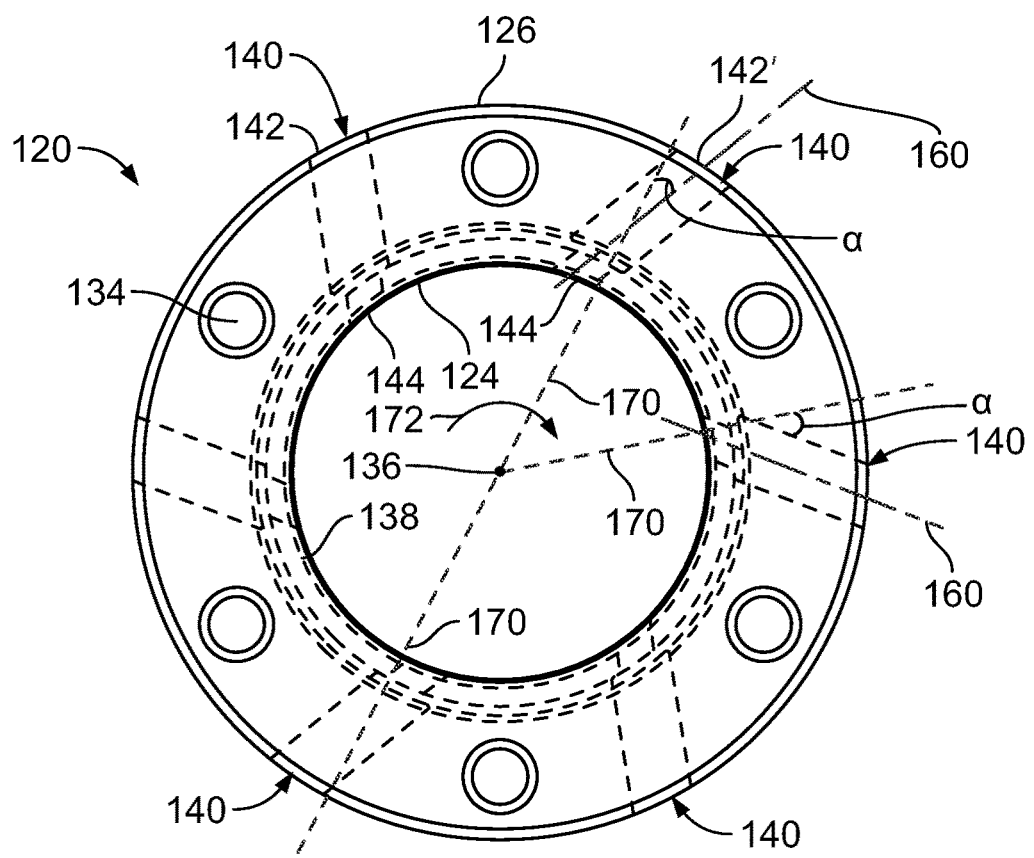
FIG. 6A illustrates a front view of the demister, according to an embodiment of the present disclosure.

FIG. 6A illustrates a front view of the demister 120. The fluid passages 140 are angled with respect to a radial line 170 extending from the central longitudinal axis 136. For example, the central axis 160 (extending between the fluid inlet opening 142 and the fluid outlet opening 144) of each fluid passage 140 is canted with respect to the radial line 170 at an angle α. The angle α is greater or less than 0 degrees. In at least one embodiment, the angle α is between 10 radial degrees and 45 radial degrees. In at least one embodiment, the fluid passages 140 are angled toward a direction of rotation 172. For example, the fluid inlet opening 142 of a fluid passage 140 is canted radially forward in the direction of rotation 172 from the fluid outlet opening 144. Optionally, the fluid passages 140 may be angled away from the direction of rotation. Alternatively, the fluid passages 140 may not be angled with respect to the radial lines 170.

As shown, the demister 120 includes six regularly-spaced fluid passages 140. Optionally, the demister 120 may include more or less than six fluid passages 140.

Figure 6B:
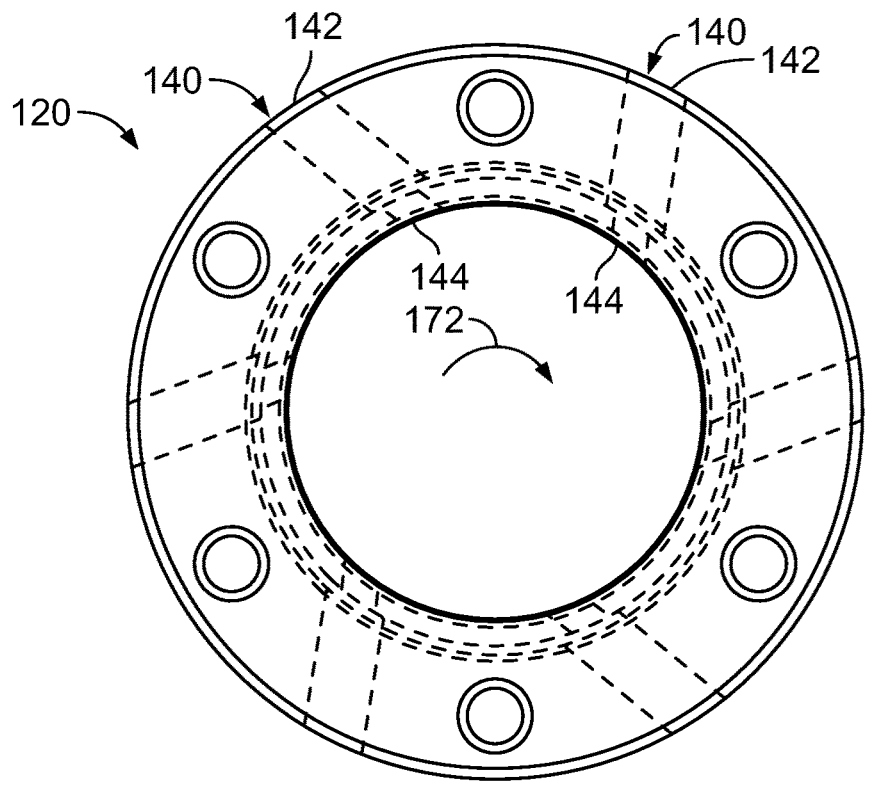
FIG. 6B illustrates a front view of the demister, according to an embodiment of the present disclosure.

FIG. 6B illustrates a front view of the demister 120, according to an embodiment of the present disclosure. The embodiment shown in FIG. 6B is similar to the embodiment shown in FIG. 6A, except that the fluid passages 140 are angled away from the direction of rotation 172. For example, as shown in FIG. 6B, the fluid inlet openings 142 of the fluid passages 140 are canted radially rearward from the direction of rotation 172 in relation to the fluid outlet openings 144.

Figure 7:
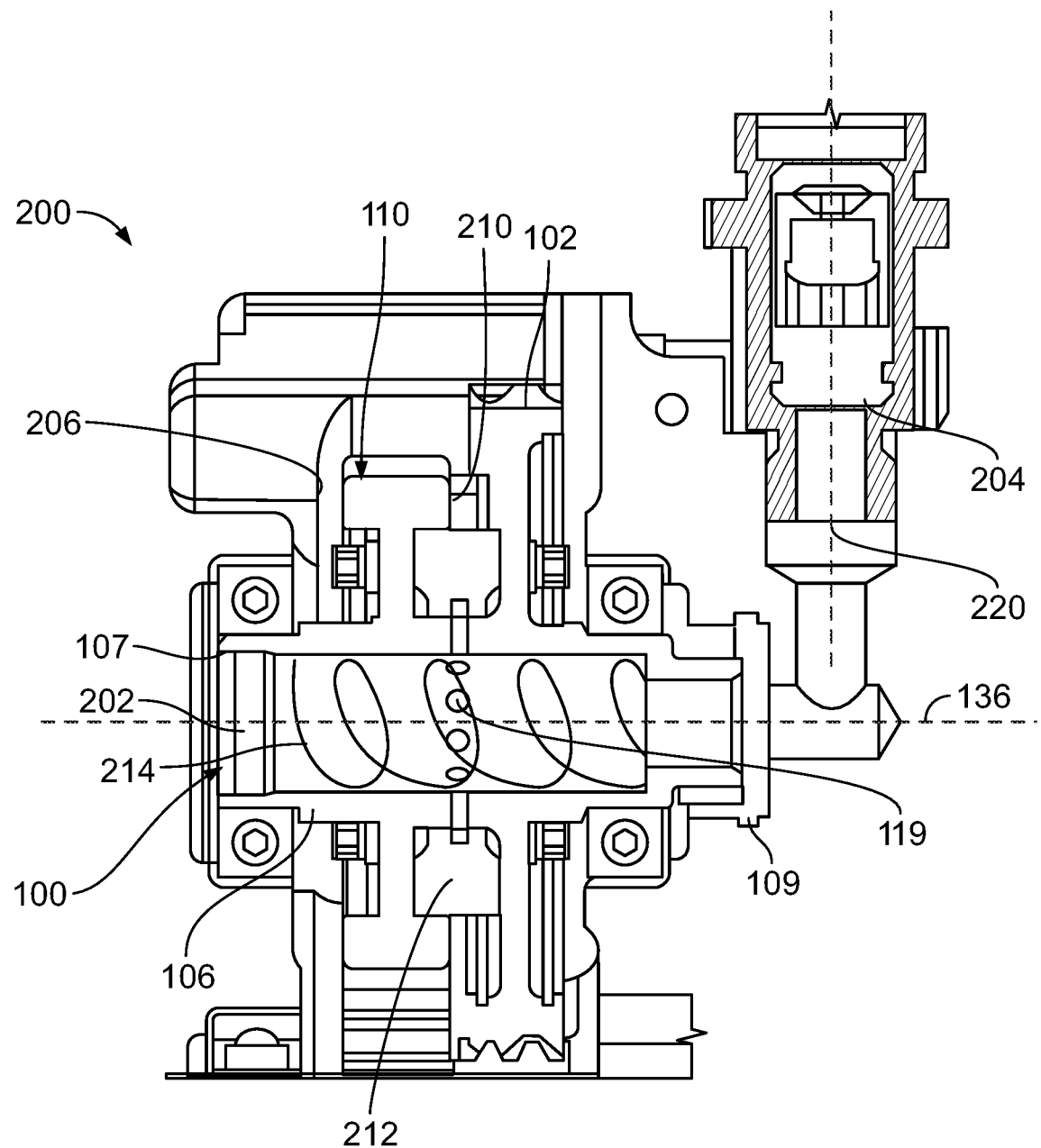
FIG. 7 illustrates an axial cross-sectional view of a gearing system within an auxiliary power unit (APU), according to an embodiment of the present disclosure.

FIG. 7 illustrates an axial cross-sectional view of the gearing system 100 within an APU 200, according to an embodiment of the present disclosure. A front end 107 of the central shaft 106 may be closed with a plug 202. A rear end 109 may be fluidly coupled to an air pressure regulating valve 204. In operation, secondary air from an engine flows into a gearbox 206. Referring to FIGS. 1-7, the oil particles may combine with the air and flow as combined fluid 210 into fluid entrance channels 150 of the demister 120 as the demister rotates along with the first gear 102 and the second gear 110. The rotation of the demister 120 exerts a centrifugal force into the combined fluid 210 which causes the oil mist particles 212 (which are heavier than air) to adhere within the demister 120 and remain within the gearbox 206, while air 214 separates therefrom, and passes out of the fluid outlet openings 144. The air 214 then passes into air passages 119 of the central shaft 106, into the air pressure regulating valve 204, and ultimately to exhaust.

In at least one embodiment, the demister 120 spins or otherwise rotates along with the first gear 102 and the second gear 110 at a high rate, such as 17,000 rpm. Such rotation centrifuges the oil mist particles back into the gearbox 206.

The demister 120 rotates about the central longitudinal axis 136, thereby creating centrifugal forces. In turn, the centrifugal forces separate the oil mist particles 212 from the air 214 to create filtered exhaust air 220, which passes out of the gearbox 206, while the oil mist particles 212 remain in the gearbox 206. The fluid passages 140, which extend radially through the main body 122, accept the combined fluid 210 at the fluid inlet openings 142 and pass filtered air 214 at the fluid outlet openings 144. In at least one embodiment, the fluid passages 140 are angled so as to control a desired pressure ratio between the inner annular rim 124 and the outer annular rim 126 of the demister 120. The fluid entrance channels 150 exert centrifugal forces into the incoming air, thereby causing the oil mist particles to separate from the air, such that the heavier oil mist particles are centrifugally forced away from the central channel 108 of the central shaft 106.

The fluid entrance channels 150 leading into the fluid passages 140 promote a swirling of the air-oil mixture as it flows into the demister 120. The swirling propels the heavier oil mist particles to the fluid outlet openings 144 where they coalesce with oil droplets and are effectively centrifuged outward, back into the gearbox 206. The fluid passages 140 are selectively angled to increase or decrease a pressure drop of the demister 120, as desired, to match pressure and flow requirements of the gearing system 100.

It has been found that the angled fluid passages 140 and the fluid entrance channels 150 increase centrifugal forces exerted into fluid including air and oil particles as the demister 120 rotates. The angled fluid passages 140 and the fluid entrance channels 150 increase separation of the oil mist particles from the air, thereby ensuring that the oil mist particles remain in the gearbox, instead of being exhausted.

As such, the angled fluid passages 140 and the fluid entrance channels 150 ensure that the demister 120 effectively and efficiently removes oil from air, while also reducing backpressure and oil consumption rate. The demister 120 provides a centrifugal separator that operates on a fluid having air and oil mist particles, thereby separating the oil mist particles from the air, before the air is discharged from the gearbox 206.

FIG. 8 illustrates an axial cross-sectional view of the gearing system 100, according to an embodiment of the present disclosure. In at least one embodiment, a tubular mesh insert 300 (such as formed of metal) may be disposed within the central channel 108 of the central shaft 106. The mesh insert 300 may be a wire mesh rolled into a cylindrical shape. The mesh insert 300 provides increased surface area to contact fluid and therefore provide additional surface area to separate oil mist particles from the air. The mesh insert 300 may be used with any of the embodiments of the present disclosure. Optionally, the gearing system 100 may not include the mesh insert 300.

In at least one embodiment, the gearing system 100 may also include a stationary shroud 302 positioned around at least a portion of the rotating demister 120. The stationary shroud 302 provides a barrier that causes air flow to the demister 120 to slow, which thereby increases contact with the fluid entrance channels 150 of the demister 120 (shown in FIG. 5). As such, the shroud 302 may increase a rate of separation of the oil mist particles from air. The shroud 302 may be used with any of the embodiments of the present disclosure. Optionally, the gearing system 100 may not include the shroud 302.

FIG. 9 illustrates a flow chart of a gearing method that is configured to separate oil mist particles from air, according to an embodiment of the present disclosure. The gearing method includes rotating (400) a main body shaped as a disk having an inner annular rim coupled to an outer annular rim through a first wall and a second wall opposite from the first wall about a central longitudinal axis. Said rotating (400) creates centrifugal forces that separate the oil mist particles from the air. The method also includes accepting (402) incoming air at a fluid inlet opening in an outer annular rim of at least one fluid passage that extends radially between and through the inner annular rim and the outer annular rim, and discharging (404) filtered air having a reduced amount of the oil mist particles from a fluid outlet opening in the inner annular rim.

In at least one embodiment, said accepting (402) includes accepting the incoming air from a fluid entrance channel in fluid communication with the fluid inlet opening in the outer annular rim. The gearing method may also include angling the at least one fluid passage fluid with respect to a radial line extending from the central longitudinal axis. Said angling may include angling the at least one fluid passage toward or away from a direction of rotation.

As described herein, embodiments of the present disclosure provide a demister that that effectively and efficiently removes oil from air. Further, the demister reduces backpressure and oil consumption rate within a system, such as a gearbox of an APU.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A demister for a gearing system, the demister comprising:
   a main body shaped as a disk having an inner annular rim coupled to an outer annular rim through a first wall and a second wall opposite from the first wall, wherein a central opening is defined by the inner annular rim and extends between and through the first wall and the second wall, and wherein the main body is configured to be rotated about a central longitudinal axis to create centrifugal forces that separate oil mist particles from air; and
   a fluid passage extending radially between and through the inner annular rim and the outer annular rim, wherein the fluid passage includes a fluid inlet opening in the outer annular rim and a fluid outlet opening in the inner annular rim, wherein the fluid inlet opening is configured to accept incoming air, and wherein the fluid outlet opening is configured to discharge filtered air.

2. The demister of claim 1, further comprising a fluid entrance channel in fluid communication with the fluid inlet opening in the outer annular rim.

3. The demister of claim 2, wherein the fluid entrance channel extends along a portion of a circumference of the outer annular rim.

4. The demister of claim 2, wherein the fluid entrance channel includes a proximal end fluidly coupled to the fluid inlet opening and a distal end distally away from a union of the fluid inlet opening and the proximal end.

5. The demister of claim 4, wherein a first depth of the fluid entrance channel at the distal end is less than a second depth of the fluid entrance channel at the proximal end.

6. The demister of claim 2, wherein the fluid entrance channel is offset from a central axis of the fluid passage.

7. The demister of claim 1, wherein the fluid passage is angled with respect to a radial line extending from the central longitudinal axis.

8. The demister of claim 1, wherein the fluid passage is angled toward or away from a direction of rotation.

9. The demister of claim 1, wherein the fluid inlet opening is canted radially forward or rearward with respect to a direction of rotation from the fluid outlet opening.

10. A gearing system comprising:
a first gear having a central shaft defining a central channel;
a second gear; and
a demister coupled to the first gear and the second gear, wherein the demister comprises:
a main body shaped as a disk having an inner annular rim coupled to an outer annular rim through a first wall and a second wall opposite from the first wall, wherein a central opening is defined by the inner annular rim and extends between and through the first wall and the second wall, wherein an outer portion of the central shaft of the first gear extends through the central opening, and wherein the main body is configured to be rotated about a central longitudinal axis to create centrifugal forces that separate oil mist particles from air; and
a fluid passage extending radially between and through the inner annular rim and the outer annular rim, wherein the fluid passage includes a fluid inlet opening in the outer annular rim and a fluid outlet opening in the inner annular rim, wherein the fluid inlet opening is configured to accept incoming air, and wherein the fluid outlet opening is configured to discharge filtered air.

11. The gearing system of claim 10, wherein the demister further comprises a fluid entrance channel in fluid communication with the fluid inlet opening in the outer annular rim, and wherein the fluid entrance channel extends along a portion of a circumference of the outer annular rim.

12. The gearing system of claim 11, wherein the fluid entrance channel includes a proximal end fluidly coupled to the fluid inlet opening and a distal end distally away from a union of the fluid inlet opening and the proximal end, and wherein a first depth of the fluid entrance channel at the distal end is less than a second depth of the fluid entrance channel at the proximal end.

13. The gearing system of claim 11, wherein the fluid entrance channel is offset from a central axis of the fluid passage.

14. The gearing system of claim 10, wherein the fluid passage is angled with respect to a radial line extending from the central longitudinal axis, wherein the fluid passage is angled toward or away from a direction of rotation, and wherein the fluid inlet opening is canted radially forward or rearward with respect to a direction of rotation from the fluid outlet opening.

15. The gearing system of claim 10, further comprising a mesh insert disposed within the central channel.

16. The gearing system of claim 10, further comprising a stationary shroud positioned around at least a portion of the demister.

17. A gearing method for separating oil mist particles from air, the gearing method comprising:
rotating a main body shaped as a disk having an inner annular rim coupled to an outer annular rim through a first wall and a second wall opposite from the first wall about a central longitudinal axis, wherein said rotating creates centrifugal forces that separate the oil mist particles from the air;
accepting incoming air at a fluid inlet opening in an outer annular rim of a fluid passage that extends radially between and through the inner annular rim and the outer annular rim; and
discharging filtered air having a reduced amount of the oil mist particles from a fluid outlet opening in the inner annular rim.

18. The gearing method of claim 17, wherein said accepting comprises accepting the incoming air from a fluid entrance channel in fluid communication with the fluid inlet opening in the outer annular rim.

19. The gearing method of claim 17, further comprising angling the fluid passage with respect to a radial line extending from the central longitudinal axis.

20. The gearing method of claim 19, wherein said angling comprises angling the fluid passage toward or away from a direction of rotation.

* * * * *